UNITED STATES PATENT OFFICE.

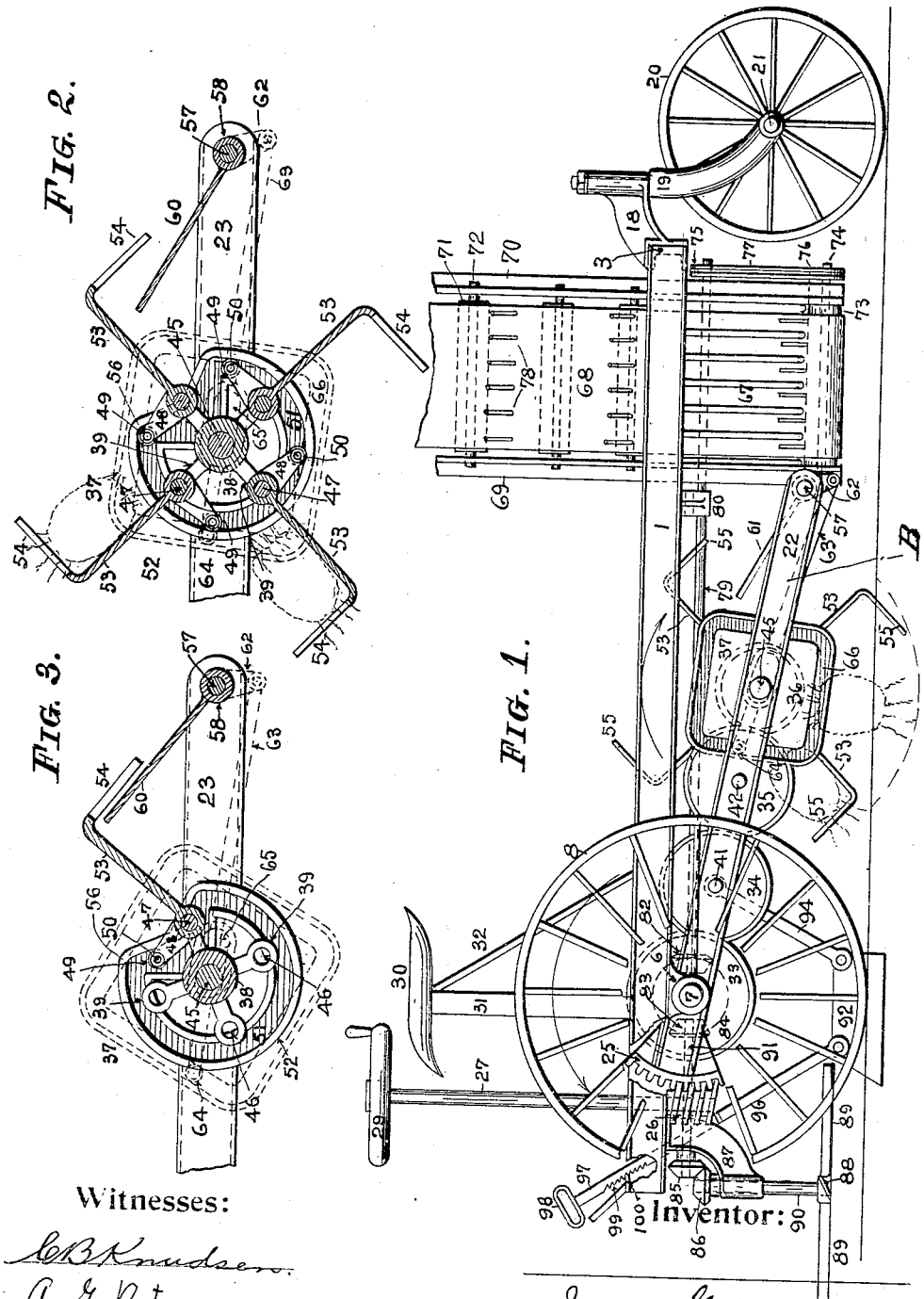

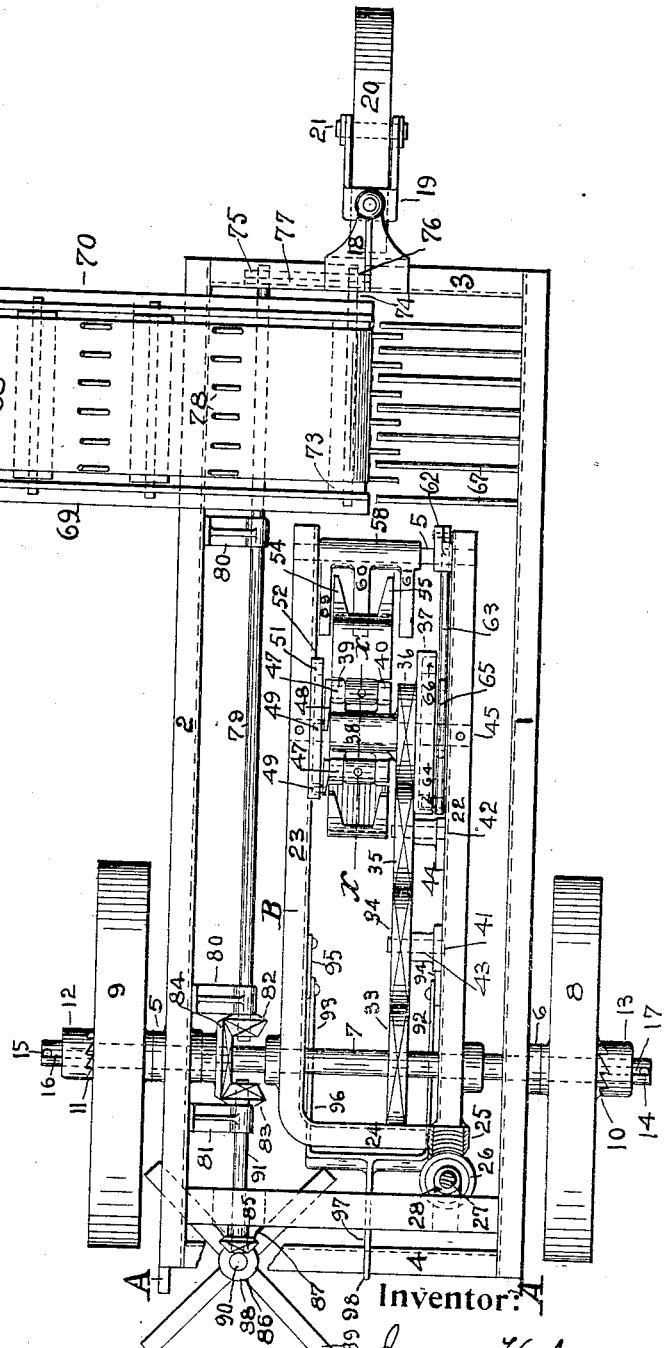

JAMES KOLIN, OF CHICAGO, ILLINOIS.

SUGAR-BEET HARVESTER.

No. 912,577.          Specification of Letters Patent.        Patented Feb. 16, 1909.

Application filed August 1, 1908. Serial No. 446,445.

*To all whom it may concern:*

Be it known that I, JAMES KOLIN, a citizen of the United States, and a resident of Chicago, in the county of Cook, in the State of Illinois, have invented certain new and useful Improvements in Sugar-Beet Harvesters; and I do hereby declare that the following description of my said invention, taken in connection with the accompanying sheets of drawings, forms a full, clear, and exact specification, which will enable others skilled in the art to which it appertains to make and use the same.

This invention has general reference to machines for harvesting bulbous vegetables such as beets, &c.; and it consists, essentially, in the novel and peculiar combination of parts and details of construction, as hereinafter first fully set forth and described and then pointed out in the claims.

The object of this invention is the production of an efficient, serviceable and effective machine for harvesting sugar beets, that shall be simple in construction, not liable to get out of order and that can be manufactured and sold at a reasonable price.

In the drawings already referred to, which serve to illustrate this invention more fully, Figure 1 is a side elevation of my improved beet harvester, parts being broken away to better illustrate details of construction. Fig. 2 is a vertical section of the harvesting and delivery mechanism proper taken in line *x x*, of Fig. 4. Fig. 3 is a similar view showing parts in different positions. Fig. 4 is a plan of my device.

My invention consists of a main frame composed of side members 1 and 2 and front and rear ties 4 and 3, said parts being preferably made from light structural channels. At the forward end of these channels are lugs A for attachment of a usual double team draft pole not shown. To the under side of these channels 1 and 2, near their forward ends are affixed journal boxes 6 and 5 for the reception and free revolution therein of a shaft or drive and supporting axle, 7, which axle carries near its extremities traction wheels 8 and 9. These wheels revolve freely on axle 7, and have on their outer hub faces clutch serrations 10 and 11, which are engaged by similar serrations on clutches 13 and 12, slidably splined upon shaft 7 by splines or feathers 17 and 16, pins 14 and 15 at the extremities of shaft 7 preventing entire removal of clutches 13 and 12 from said shaft. The direction of the serrations just referred to is such that while the wheels are traveling in a forward direction the clutches will remain in mesh and the shaft 7 be revolved. If, however, the motion is reversed the clutches will slide out of mesh in a manner easily comprehended.

To the rear frame-tie 3 is attached bracket 18, within which is journaled the shank of fork 19. In this fork is hung rear wheel 20 upon pin 21, the whole forming a trailing support for the rear end of the device.

Within the frame, journaled upon the shaft 7, and adapted to oscillate vertically, is an auxiliary frame B composed of side channels 22 and 23, which channels join together at the forward end and terminate in a worm-gear segment 25. Into this segment meshes a worm 26 fastened to an upright shaft 27. This shaft is journaled in box 28 and has at its upper end a hand wheel 29, said hand-wheel being located convenient to a driver's seat 30 which is fastened to the main frame by supports 31 and 32.

Between the side channels 22 and 23 of the auxiliary frame B, on the shaft 7, is fastened gear 33, which forms the first of a train composed of idler gears 34 and 35 and driven gear 36. Said gears 34 and 35 revolve loosely on pins 41 and 42, which pins are fastened in brackets 43 and 44, said brackets, in turn, being affixed to side channel 22. Gear 36 just referred to is cast integral with a raceway cam 37 and a spider 38, and revolves freely on shaft 45, which is fixed in side channels 22 and 23. Spider 38 has a series of radial lugs 39, 40, all being transversely drilled at 46, for the reception of freely fitting shafts 47. These shafts have at one of their extremities, levers 48, and at the free ends of these levers are journaled rollers 49 on pins 50. All of these rollers engage in a groove 51 of a raceway or face cam 52, which is fastened to channel 23 in a position concentric with shaft 45.

Between the series of radial lugs 39, 40, on spider 38, and to shafts 47, are fastened radial leaves 53. The free extremities of these leaves terminate in forked ends 54, 55, set rearwardly at practically right angles to the leaves proper, as clearly seen in Figs. 1, 2, 3 and 4.

Cam 52 which is fastened to channel 23 has an annular groove 51 which is truly concentric for 270°. But the last 90° depart from this concentric course at the highest point, as shown at 56 in Figs. 2 and 3, toward the center of the cam 52 and then returns to its concentric course. As before mentioned, the rollers 49 on levers 48 engage this groove 51. It will now be observed that when spider 38 with its complement of shafts 47, levers 48, and leaves 53 is revolved in the direction shown by the arrow in Fig. 1, the leaves 53 will be maintained in a radial position for three fourths of a revolution. But as each successive lever reaches the point 56, the pressure of the edge of groove 51 which actuates lever 48, will force the lever down until the roller 49 touches the spider 38. This action will throw the leaf out of a radial line in a direction opposite to the direction of revolution until the said roller is directed back into the concentric groove.

Near the rear or free ends of the channels 22, 23, of the auxiliary frame B is journaled a shaft 57, upon which is mounted a hub 58 having forwardly extending fingers 59, 60, and 61. The finger 60 is adapted to pass between the forked ends 54, 55, of the leaves 53, and the other two on the two sides thereof as shown in Fig. 4. On the said shaft 57, adjacent to channel 22 is fixed a downwardly pending crank arm 62, to which is fixed a connecting rod 63. This rod is slotted at 65 to embrace shaft 45, and has at its outer end a roller 64, engaging groove 66 in raceway cam 37. The path of the groove 66 describes a square with rounded corners as shown in Figs. 1, 2, and 3, so that upon one revolution of said cam four backward and forward motions are imparted to connecting rod 63. And through said rod, crank arm 62, and shaft 57, four up and down oscillations of hub 58 and fingers 59, 60, and 61 are obtained. Cam 37 is so placed with relation to cam 52 that just before any one of the rollers 49 on levers 48 reaches the gap 56, the upward movement of fingers 59, 60, and 61 will begin.

Adjacent to the auxiliary frame B and depending from the side channel 1 of the main frame, are a series of bars 67 forming a grating to receive the harvested beets, and from this grating leading upwardly and transversely of the main frame is a conveyer belt 68 having pins 78 to pick up the beets from the said grating. This belt is driven by a driving drum 73, and is supported by idler rollers 71, all of which are supported in side frames 69, 70, by means of shafts 74, 72 respectively. Motion is imparted to drum 73 by means of driven sprocket 76 fastened to shaft 74, driving chain 77, and driving sprocket 75, which latter is fastened to shaft 79. This shaft 79 is supported in brackets 80 and extends parallel to side channel 2 from the sprocket 75 forward toward the main shaft or drive axle 7, where it derives motion through bevel gear 84 fastened to said drive axle, and bevel pinion 82 at its own extremity.

Directly below the forward cross channel 4 of the main frame and a short distance above ground level is located a four bladed cutter 89 having a hub 88 fastened to upright shaft 90. Said shaft is journaled in a bracket 87 and has at its upper end a miter gear 86 which meshes in a similar gear 85. The latter gear is fixed to horizontal shaft, 91, which revolves in said bracket 87 and bracket 81. Adjacent to bracket 81 on said shaft 91, is a bevel pinion 83 which engages with, and receives motion from, bevel gear 84 on the main drive shaft 7.

The mechanism just described performs the functions of cutting the tops or leaves off the beets as the machine advances, before they are harvested by the harvesting mechanism.

Below the axle 7, penetrating the ground, and extending in a direction parallel to the main frame are two straight cutting plows 92, 93. Their rear ends are connected to the auxiliary frame B by means of links 94, 95, and from their forward extremities leads a fork 96 which terminates in an upwardly extending bar 97 having a handle 98 by means of which the knives may be raised or lowered. To keep the plows in position the bar 97 has saw teeth notches 99 on its under side which engage a catch 100 on the cross channel 4.

The operation of my device may now be described as follows: Assuming a draft pole to be attached to lugs A on the main frame and a team of horses harnessed thereto, the harvester is hauled over a row of beets with wheels 8, 9, on the two sides of the row. The handle 97 is depressed, forcing the side plows 92 and 93 into the ground to a depth below the beets. The hand wheel 29 is turned until the fork ends 55, 54 penetrate the soil deeper than the roots of the beets and the machine is started. As the harvester advances, the revolving cutter 89 cuts off the tops of the beets; closely following the side plows 92, 93, cut parallel grooves in the soil on the two sides of the beet row, separating that soil from the surrounding earth. Then the revolving leaves 53 with the fork ends 55, 54, penetrate the soil below the roots and bodily pick up the beets and carry them around as shown in dotted lines in Fig. 2. As the successive leaves 53 reach the vertical position they fly backward, as hereinbefore described, and permit the beets to roll off onto the advancing fingers 59, 60 and 61. The continued advancement of these fingers carries the beets over and drops them upon the grating 67. The shaking up thus received removes from the beets all of the earth should any adhere thereto, and allows it to drop between the bars of the grating.

From this grating the beets are picked up by the pins 78 on the conveyer belt 68 and by said belt carried up and deposited in a wagon or other receptacle, not shown, traveling alongside the harvester or forming a part of the machine.

I have heretofore described the leaves 53 with their forked ends 54, 55, which leaves are mounted and revolve in the auxiliary frame B. These leaves act as lifters to pull the beets out of the ground after the plows 92, 93, have cut down the sides of the hills in which the beets are grown so that the forked ends may take hold of the beets below the ground. In order to prevent injury to the beets it may be desirable to cover the forked ends of these lifters with an elastic covering such as rubber, &c. in a manner readily comprehended.

Having thus fully described this invention, I claim as new and desire to secure to me by Letters Patent of the United States—

1. In a beet-harvester the combination with a series of rotating, fork-shaped, lifters, of means for imparting to said lifters a combined swinging and rotating movement and a take-off having a swinging motion coacting with the said lifters whereby the beets are released from said lifters and taken up by said take-off.

2. In a beet-harvester, the combination, with a set of revolving lifters, gearing for rotating said lifters; a square-shaped cam-disk rotating in unison with said lifters; a rocking-shaft carrying a crank arm at one end; a connecting rod engaging said crank with one end and the groove in said cam with its opposite end; and a series of fingers upon said shaft, whereby a series of rocking motions is imparted to said fingers coöperating with the series of revolving lifters.

3. In a beet-harvester, a series of fork-shaped lifters; means for imparting a rocking motion to said lifters at predetermined intervals; a rocking take-off, and means for actuating said take-off in unison with the swinging movement of the lifters.

4. In a beet-harvester, a main-frame; a series of revolving, fork-shaped, lifters in, and in combination with, an auxiliary frame; means for imparting a compound rotary and swinging movement to said lifters, a take-off, and means for imparting a multiple rocking motion to said take-off for every single revolution of the lifters corresponding in sequence with the number of fingers in said lifter.

5. In a beet-harvester, a main-frame; traction, and steering-wheels upon which said main-frame is mounted; an auxiliary frame hinged at one end to said main-frame; worm and segment-mechanism for raising and lowering said auxiliary frame; fork-shaped lifters journaled in said auxiliary frame; mechanism for rotating said lifters; means for imparting a swinging movement to said lifters when rotating; a take-off pivoted to said auxiliary frame, and mechanism for imparting a rocking movement to said take-off, said mechanism being constructed to impart a multiple movement to the take-off for every single rotating movement of the lifters.

6. In a beet-harvester, with the auxiliary frame, of a shaft; a series of rotating and swinging lifters mounted upon said shaft; mechanism for rotating said lifters; a take-off coacting with said lifters; a shaft upon which said take-off is mounted, and mechanism for actuating said take-off in unison with the swinging movement of said lifters, said mechanism comprising a square-shaped cam mounted upon the shaft carrying the lifters, a shaft carrying the take-off; a downwardly-pending arm on the latter shaft; a slotted connecting-rod attached with one end to said arm and having a roller at its opposite end engaging said cam.

In testimony that I claim the foregoing as my invention I have hereunto set my hand in the presence of two subscribing witnesses.

JAMES KOLIN.

Attest:
MICHAEL J. STARK,
WILLIAM O. STARK.